United States Patent

[11] 3,600,964

| [72] | Inventor | Thomas F. Sarah<br>Akron, Ohio |
|---|---|---|
| [21] | Appl. No. | 16,761 |
| [22] | Filed | Mar. 5, 1970 |
| [45] | Patented | Aug. 24, 1971 |
| [73] | Assignee | Shakespeare of Arkansas, Inc.<br>Fayetteville, Ark. |

[54] OPTIONALLY AUTOMATIC TWO SPEED DRIVE FOR A FISHING REEL
18 Claims, 8 Drawing Figs.

[52] U.S. Cl. .................................................. 74/369,
74/337.5, 74/665 C, 242/84.21, 242/215, 242/219
[51] Int. Cl. ......................................................... F16h 3/08,
F16h 5/06, F16h 37/06
[50] Field of Search ......................................... 74/369,
363, 337.5, 665; 242/84.21, 215, 219

[56] References Cited
UNITED STATES PATENTS

| 2,240,075 | 4/1941 | Kovalovsky et al. ........... | 242/215 |
|---|---|---|---|
| 2,255,983 | 9/1941 | Olson ............................ | 74/337.5 |
| 2,417,732 | 3/1947 | Bland et al. ................... | 242/84.1 |
| 3,178,955 | 4/1965 | Enders et al. .................. | 74/369 |

Primary Examiner—Arthur T. McKeon
Attorney—Hamilton, Cook, Renner & Kenner

ABSTRACT: A variable drive for fishing reels—adaptable with equal facility to spinning, spin-casting, bait casting and trolling type reels—to provide a high and low speed transmission ratio. Each speed ratio has a corresponding gear train operatively connected between a driving rod and a driven shaft. The two gear trains each have a driving gear carried on the driving shaft. The driving gear for at least the high speed ratio is rotatably mounted on the driving shaft, and a coupling means engages the driving gear to permit it to slip with respect to the driving shaft in response to a predetermined torque loading. The second driving gear in two of the three embodiments depicted herein is also rotatably mounted on the driving shaft and engaged by the coupling means so that the second driving gear is permitted rotatably to slip with respect to the driving shaft only in response to a predetermined, greater torque loading. In the third embodiment the second driving gear is secured to the driving shaft for rotation only therewith, and the coupling means, in that embodiment, is connected between the two driving gears. The first and second driving gears mesh with corresponding first and second pinions carried on the driven shaft. The first pinion is connected to rotate only with said driven shaft, but the second pinion is mounted so as to be movable with respect to the driven shaft. A unidirectional clutch means operatively connects the two pinions so that the first pinion can overrun the second pinion but not vice versa. A selector means is also disclosed whereby the automatic selection of the speed ratios in response to the torque loading can be manually overridden.

PATENTED AUG 24 1971　　　　　　　　　3,600,964

INVENTOR.
THOMAS F. SARAH
BY Hamilton, Cook,
Renner + Kenner
ATTORNEYS

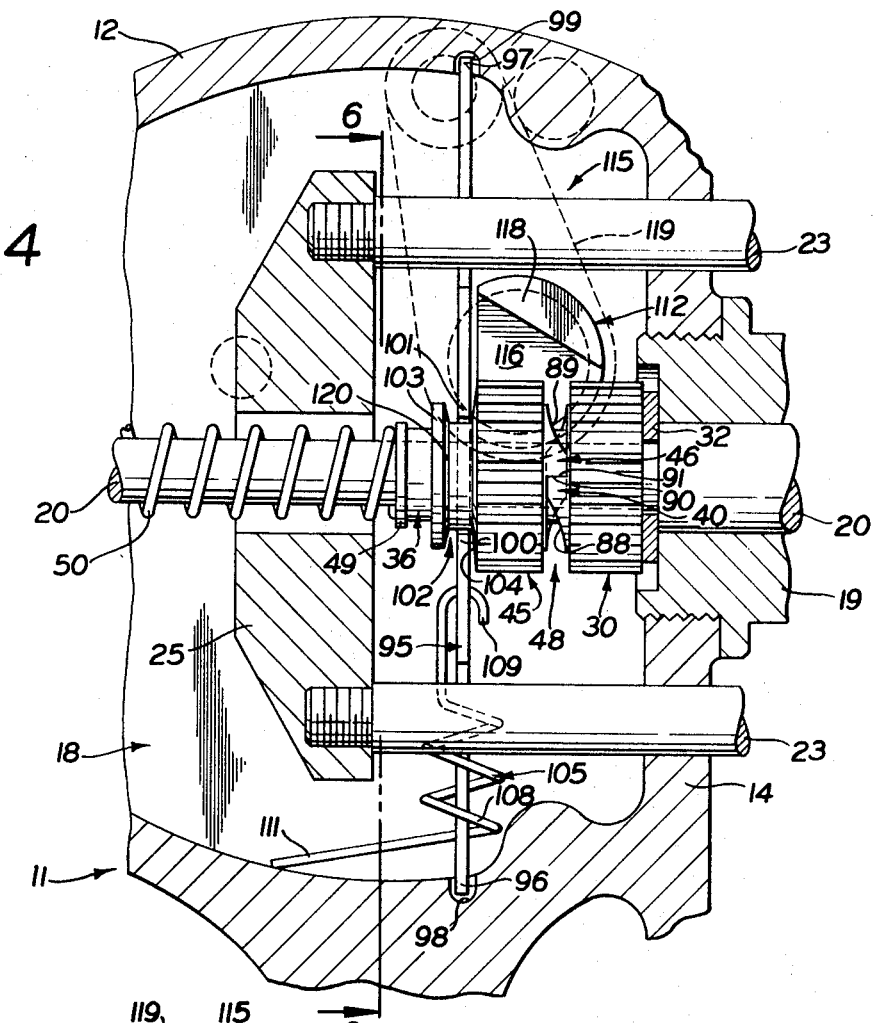

OPTIONALLY AUTOMATIC TWO SPEED DRIVE FOR A FISHING REEL

BACKGROUND OF THE INVENTION

The present invention relates to a variable drive for a fishing reel—particularly to a variable drive that automatically shifts between two transmission ratios in response to the resistance encountered during the retrieval of the line, although the automatic shift may be selectively eliminated.

By and large most fishing reels have a single transmission ratio. That is, the mechanism by which line is retrieved will recover only a fixed number of coils onto the spool in response to a single revolution of the crank. Although there are other factors that will tend to influence the number of inches of line that will actually be retrieved in response to a single turn of the crank, the length of line that will be actually retrieved for each turn of the crank depends primarily on the transmission ratio of the gear train in that operatively connects the crank to the line spooling mechanism.

In reels having only a single transmission ratio a compromise must be effected between a high speed ratio to afford rapid retrieval, when desired, and a lower speed ratio to afford a more delicate sensitivity when playing fish. Many times the elected compromise will militate against the fisherman when playing the fish. For example, it has been long known that the line should be maintained taut while playing the fish. The rod accommodates many variations in the movement of the fish in order to allow the fisherman some lag time in which to respond with the proper manipulation of the reel, but when playing fish that are noted particularly for their strength, speed and fighting qualities, the rod and the fisherman's reaction time may not be adequate to maintain the required tautness in the line as, for example, when the fish turns toward the fisherman. For this situation, in particular, it is most desirable that the transmission ratio accommodate automatically to the particular action of the fish.

There are also clearly situations where the particular lure being used requires an extremely fast retrieve: to attract the type fish sought; to effect proper action in the lure; or, to maintain the lure at the desired depth. Yet, when a fish is hooked a high speed retrieve can become an anathema. This situation can be improved by selective manual speed changing mechanism but is more ideally accommodated by an automatic speed change in response to the strike of the fish.

One must also appreciate that as the amount of line between the rod and the fish increases, the drag resistance should be lowered in order to prevent the line from being inadvertently subjected to a stress in excess of its test. In this situation a manual selection of a lower drag is preferred.

Last, but certainly not least, when a fish of lesser dimension than that sought takes the lure, good sportsmanship demands that he be subjected to a lesser drag resistance so that he will be afforded a more fighting chance to escape. In this situation as well, a manual drag reduction is preferred.

Heretofore, many attempts have been made to provide a two speed transmission for a fishing reel. Most prior known variable speed transmissions for fishing reels limit selection of the speed to a manual operation, as by: a selector device independent of the crank; the direction in which the crank is rotated; or, lateral translation of the crank and driving shaft. Some prior art constructions even provide for automatic shift, but they generally utilize complicated and expensive arrangements—such as planetary gear systems —and of those only a very few relate a variation of the drag to the speed selection.

SUMMARY OF THE INVENTION

It is, therefore, a primary object of the present invention to provide a two speed variable drive transmission for fishing reels—the speed ratios being automatically selected in response to preselected resistance offered against line retrieval.

It is another object of the present invention to provide a variable drive, as above, in which the automatic selection can be manually overcome to provide only high speed retrieval of the line.

It is a further object of the present invention to provide a variable drive, as above, in which at least that gear train providing the high speed transmission ratio includes a predetermined drag.

It is a still further object of the present invention to provide a variable drive, as above, that is not only inexpensive to manufacture and maintain but is also readily adaptable to spinning, spin-casting or bait casting reels.

These and other objects of the invention, as well as the advantages thereof over existing and prior art forms, will be apparent in view of the following detailed description of the attached drawings and are accomplished by means hereinafter described and claimed.

In general, a variable drive embodying the concept of the present invention has a driving and a driven shaft connected by two gear trains affording first and second transmission ratios. Each of the gear trains employs a driving gear operatively connected to the driving shaft—the driving gear in at least one gear train being rotatable with respect to the driving shaft so that the operative connection therebetween is effected by way of a coupling means that permits relative rotation therebetween in response to a predetermined torque loading.

The driving gear in the first gear train meshes with a first portion operatively connected to be rotatable only with said driven shaft, and the driving gear in the second gear train meshes with a second pinion that is mounted on the driven shaft to be movable with respect thereto. A clutch means interconnects said two pinions for unidirectional drive.

Three alternative embodiments of the subject variable drive are shown by way of example in the accompanying drawings and hereinafter described in detail without attempting to show all of the various forms and modifications in which the invention might be embodied; the invention being measured by the appended claims and not by the details of the specification.

DESCRIPTION OF THE DRAWINGS

FIG. 4 is a further vertical section taken substantially on line 4–4 of FIG. 2 and depicting a portion of the arrangement represented in FIG. 1 as viewed from the opposite side;

FIG. 5 represents a partial area of FIG. 4, but depicts the first and second pinions separated by a selector means to disengage the unidirectional clutch by which the second pinion can drive the first pinion;

DESCRIPTION OF THE PREFERRED EMBODIMENTS

Figure 1:
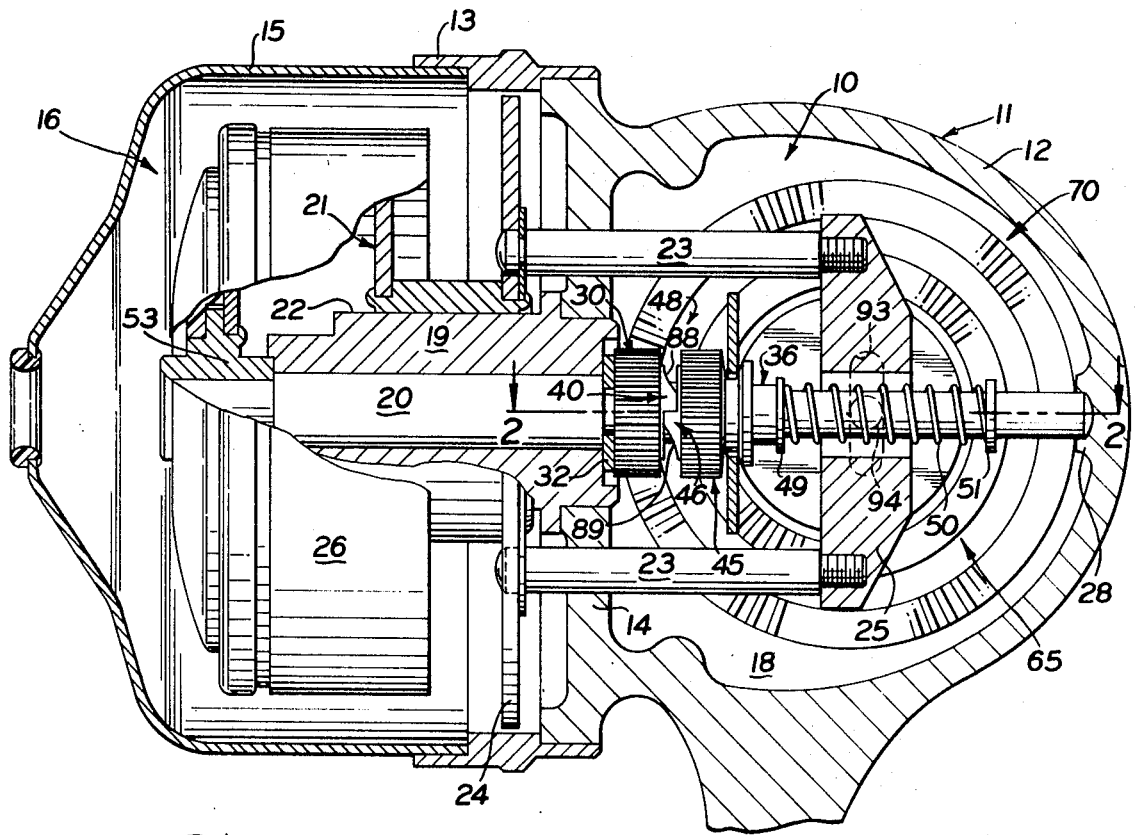
FIG. 1 is a vertical section through a spin-casting reel provided with an optionally automatic two speed drive embodying the concept of the present invention.
Figure 6:
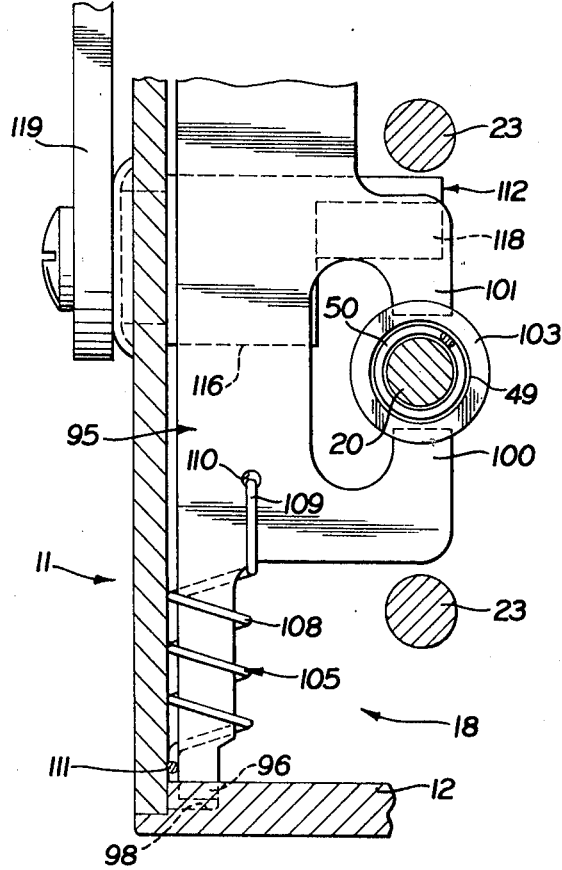
FIG. 6, appearing on the same sheet of drawings as FIG. 1, is a further horizontal section taken substantially on line 6–6 of FIG. 4 depicting a portion of the selector means in elevation.

Referring more particularly to the drawings, one preferred embodiment of the subject variable drive, indicated generally by the numeral 10, is depicted, in FIGS. 1—6, as being incorporated in a closed face, or spin-casting reel 11. As best seen in FIG. 1, the spin-casting reel 11 has a housing 12 that presents an annular cap supporting flange 13 extending outwardly of a transverse divider wall 14. A cap 15 is supported on the annular flange 13 so that the cap 15, flange 13 and divider wall 14 circumscribe a spool compartment 16. On the opposite side of the divider wall 14, and within the housing 12, is a gear compartment 18.

Fixed to, and extending forwardly of, the divider wall 14 is a cylindrical sleevelike bearing bushing 19. A driven shaft 20, often referred to as the flyer shaft, is rotatably journaled through the interior of the bushing 19, and a line spool 21 is supported on the exterior, cylindrical surface 22 of the bushing 19 so as to be reciprocatingly slidable therealong. A plurality of spool pins 23 are secured to the rear flange 24 of the line spool 21 and extend slidably through the divider wall 14 into the gear compartment 18 where they are secured to a traverse block 25. The traverse block is reciprocated by means hereinafter more fully described to effect a level winding of the line onto the spool 21 during the retrieve.

The forward portion of the driven shaft 20 extends beyond the forward portion of bushing 19 and is secured to a flyer 26. The flyer 26 rotates with the driven shaft 20 and carries a pickup means, not shown, by which the line may be wound onto the spool 21 during the retrieve. Because the prior art possesses a wide variety of pickup means that are well known to those skilled in this art and further because the selection of the particular pickup means employed does not bear upon the operation of the subject variable drive a detailed description of a particular pickup means has been omitted.

The rearward portion of the driven shaft 20 extends outwardly of bearing bushing 19 at the divider wall 14, across the gear compartment 18 and possibly into a journal boss 28 formed in the housing 12, as shown, or it may connect to an actuating means, now shown, by which to reciprocate the flyer for snubbing the line or operate a line pickup mechanism. In proximity to the bushing 19 a first pinion 30 is mounted on the driven shaft 20 to be rotatable therewith. A bearing washer 32 is interposed between the first pinion 30 and the bushing 19 to minimize frictional resistance against rotation of the pinion 30.

Figure 3:
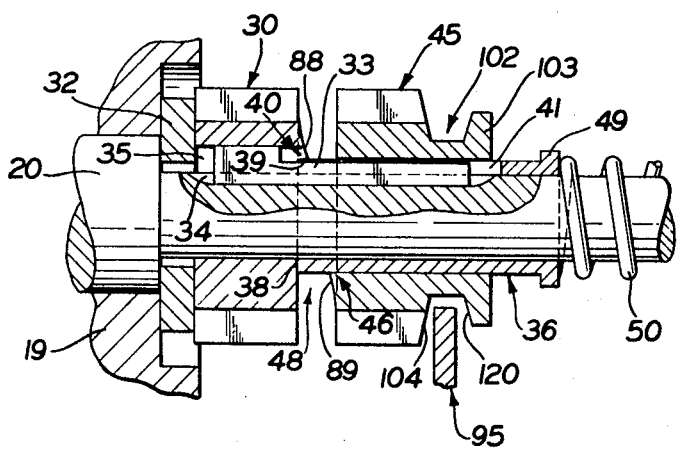
FIG. 3 is a vertical section, partly broken away, taken substantially on line 3–3 of FIG. 2 and depicting only the environment of the first and second pinions on the driven shaft.

It must be appreciated that to operate a closed face, spin-casting reel 11 (particularly to snub the line and prepare the reel for casting) it is generally required that the driven shaft 20 be axially reciprocable. As such, it would be most desirable that the shaft 20 be permitted to move axially with respect to the pinion 30 and yet maintain the connection therebetween for mutual rotation. This result may be achieved by employing a feather key 33 received within an axial key slot 34 in shaft 20 and a keyway 35 axially through the hub of the pinion 30, as best seen in FIG. 3.

A sleeve 36 is slidably received over the driven shaft 20. The annular end 38 of sleeve 36 bears against the first pinion 30 and is, in fact, received within an annular well 39 (FIGS. 2 and 5) located radially inwardly of a first pawl means 40 extending axially rearwardly from the first pinion 30. The sleeve 36 is axially slotted, as at 41, to accommodate the feather key 33 and is of sufficient radial dimension that a second pinion 45 may be rotatably and slidably supported on the cylindrical exterior surface of sleeve 36 without interference from the key 33.

A second pawl means 46 extends axially forwardly from the second pinion 45 for cooperative interaction with the first pawl means 40 to form a unidirectional clutch means 48, as will be hereinafter more fully described.

The axially rearmost extent of the sleeve 36 terminates in a radially extending flange 49, and here, too, it is a highly desirable that the axial dimension of the sleeve 36 with respect to the axial dimension of the second pinion 45 be sufficient to permit the pinion 45 to move axially along the sleeve through a sufficient range to engage and disengage the clutch means 48 as will become hereinafter apparent.

A compression spring 50 encircles the driven shaft 20 and extends between the flange 49 on sleeve 36 and a retainer ring 51 (FIGS. 1 and 2) seated within an annular groove 52 (FIG. 2) spaced axially rearwardly of the sleeve 36. Spring 50, by contact with the flange 49, maintains the first pinion in engagement with bearing washer 32 and the bearing washer 32 in engagement with the axially rearward end of the bushing 19. With the biasing action of the spring 50 thus limited in one direction the pressure of spring 50 acts against the retainer ring 51 to maintain the flyer 26 biasingly in its rearmost—but normal line retrieving—disposition with the hub 53 (FIG. 1) thereof in engagement with the axially forward end of the bushing 19. In addition, a constructional arrangement of this nature permits the driven shaft 20 to be fully capable of being moved axially forwardly from the position depicted in FIGS. 1 and 2, as is required to actuate many prior art pickup means.

Figure 2:
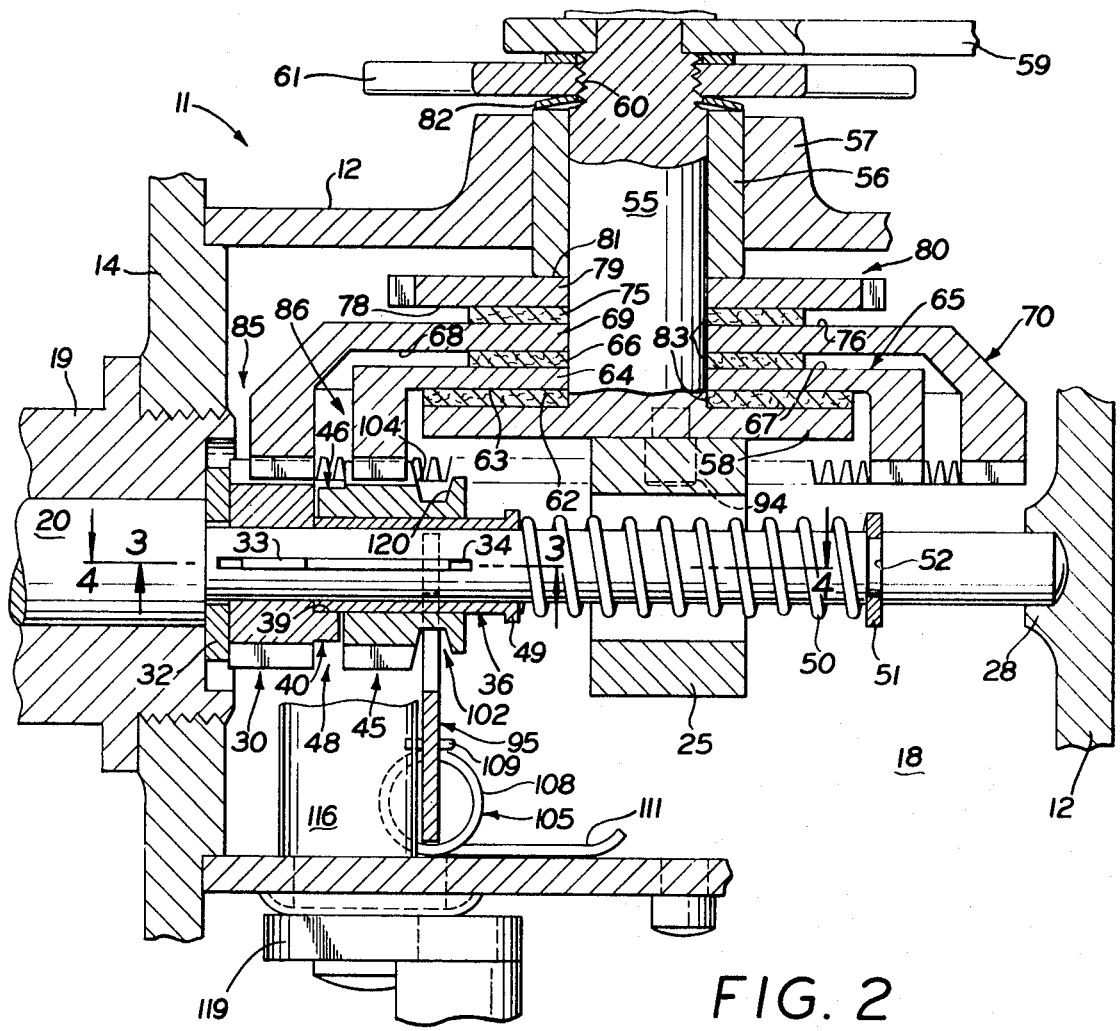
FIG. 2 is an enlarged horizontal section taken substantially on line 2–2 of FIG. 1.

Referring now more particularly to FIG. 2, a driving shaft 55 is journaled through a sleeve bearing 56 slidably supported within a hub 57 on housing 12. That portion of the driving shaft 55 that extends into the gear compartment 18 terminates in a footplate 58 secured thereto and extending radially thereof. That portion of the driving shaft 55 that extends exteriorly of the housing 12 nonrotatably mounts a crank 59 by which rotation of the driving shaft 55 can be effected. That portion of the shaft 55 between the crank 59 and the hub 57 of housing 12 is provided with threads 60 upon which a drag control knob 61 may be mounted. Of course, the control knob 61 may have any shape which is convenient for easy operation, but the standard star wheel form is generally accepted as being most suitable.

Between the footplate 58 and the drag control knob 61 the following elements are supported on the driving shaft 55. A drag washer 62 is sandwiched between the footplate 58 and one surface 63 on the web 64 of a second driving gear—face gear 65—that is mounted on the driving shaft 55 to be rotatable with respect thereto. A second drag washer 66 engages the opposite surface 67 on the web 64 of the second driving gear 65 and is itself engaged by one surface 68 on the web 69 of a first driving gear—face gear 70—that is also mounted on the driving shaft 55 to be rotatable with respect thereto. A third drag washer 75 engages the opposite surface 76 on the web 69 of the first driving gear 70.

A third drag washer 75 is, in turn, engaged by one surface 78 on the web portion 79 of an antireverse ratchet wheel 80 that is mounted on the driving shaft 55 to be slidable axially therealong but rotatable only therewith. The function of an antireverse mechanism is well known to the art and need not, therefore, be described in further detail. The opposite surface 81 of the ratchet wheel 80 is engaged by one end of the sleeve bearing 56.

A resilient means, that may be in the form of a bowed spring washer 82, is interposed between the other end of the sleeve bearing 56 and the control knob 61. As such, selective manipulation of the drag control knob 61 will vary the axial pressure applied against the webs 69 and 64 of first and second driving gears 70 and 65, respectively, by the three drag washers 75, 66 and 62 as all the components stacked along the driving shaft 55 are compressed between the foot portion 58 and the sleeve bearing 56. By selecting the surface areas of the three drag washers, their coefficients of friction and the coefficients of friction for the surfaces on the webs of the two driving gears contacted thereby—all compositely considered the coupling means 83 between the driving shaft 55 and the driving gears 65 and 70—one can be assured that the torque required to rotate the first driving gear 70 with respect to the driving shaft 55 will be of lesser magnitude than the torque required to rotate the second driving gear 65 with respect to the driving shaft 55. While the selected setting of the drag control knob 61 may raise and lower the corresponding frictional values at which the two driving gears rotate with respect to the driving shaft, a differential will, nevertheless, be maintained. The relative diameters of the two driving gears 70 and 65 may be selected, alone or in combination with the diameters of the pinions 30 and 45 with which they are respectively interselected, to provide the desired speed ratios at which the driven shaft 20 will turn with respect to rotation of the driving shaft 55. As shown, the drive train 85 comprising the first driving gear 70 and the meshing first pinion 30 will rotate the driven shaft 55 at higher speed ratio with respect to rotation of the driving shaft 20 than does the drive train 86 comprising the second driving gear 65, the pinion 45 meshed therewith and the clutch means 48 by which the second pinion 45 is connected through the first pinion 30 to rotate the driven shaft 20.

It must be appreciated that in constructions wherein the driving and driven shafts are oriented at right angles to each other, face gears, as shown, may be used with their attendant advantages.

At this time a brief explanation of the operation of the variable drive mechanism heretofore described will facilitate a basic understanding of the invention and simplify the description necessary for the additional components incorporated in this and the alternative embodiments.

To begin, it will be assumed that the drag control knob 61 has been turned to the desired setting so that as the crank 59 is rotated to retrieve a lure fastened on the line the first driving gear 70 will not slip with respect to the driving shaft 55 and will, therefore, rotate the first pinion 30 to rotate the driven shaft 20 (and the flyer 26 secured thereto) at the high speed retrieve ratio. During the time that the frictional engagement of the drag washers 66 and 75 is sufficient to rotate the first driving gear 70 at the same speed as the driving shaft 55, the first pinion 30 will rotate faster than the second pinion 45. The first pawl means 40 and the first pinion 30 and the second pawl means 46 on the second pinion 45 have inclined camming surfaces 88 and 89, respectively, (FIGS. 1 and 4) that interact to slide the second pinion 45 axially rearwardly and thus disengage the clutch means 48 to permit the first pinion 30 freely to overrun the second pinion 45 when the first driving gear 70 rotates the first pinion 30—and the driven shaft 20 and the sleeve 36 driven therewith—at a greater rate than the second driving gear 65 can rotate the second pinion 45. It must be appreciated that the axial extent of the second pinion 45 must be sufficient to retain it meshingly engaged with the second driving gear 65 during the axial movement of the second pinion occasioned by the interaction of the camming surfaces 88 and 89.

However, once the resistance offered against retrieval of the line, as by a fish, exceeds the torque loading at which the first driving gear 70 will rotate with respect to driving shaft 55— but still remains less than the frictional resistance offered against the web 64 of the second driving gear 65 by drag washers 62 and 66—the second driving gear 65 will turn the second pinion 45 with respect to the first pinion 30 until the driving shoulder 90 on pawl means 46 engages the driven shoulder 91 on pawl means 40. The clutch means 48 is thus engaged and the second pinion 45 drives the driven shaft 20 through the first pinion 30.

Should the resistance offered against retrieval of the line exceed even the torque loading at which the second driving gear 65 will rotate with respect to the driving shaft 55, rotation of the driving shaft 55 will not effect rotation of the driven shaft 20. In fact, the line may even exit from the spool 21 as the line itself rotates the flyer 26 against the frictional resistance offered against rotation of the second driving gear with respect to the driving shaft 55.

However, so long as the driving shaft 55 rotates, a pin 94 (FIGS. 1 and 4) affixed eccentrically of the footplate 58 and extending parallel to its rotational axis engages a slot 93 on the traverse block 25 to reciprocate the line spool 21 and thereby provide level wind.

As shown in FIG. 4, a flexible yoke 95 extends diametrically across the gear compartment 18 with oppositely directed tangs 96 and 97 pivotally received within appropriate slots 98 and 99 in the housing 12. A pair of opposed fingers 100 and 101 (FIG. 6) on the yoke 95 extend within an annular control notch 102 on the stem portion 103 of the second pinion 45. With the clutch means 48 engaged the fingers 100 and 101 are disposed in proximity to the forwardmost wall 104 of the control notch 102, and a spring means 105 yieldingly urges the yoke 95 toward its lineal position, as depicted in FIG. 4. The spring means 105 must not restrict the second pinion 45 against axial movement away from the first pinion 30 as occasioned by the interaction of the camming surfaces 88 and 89 on the pawl means 40 and 46 and yet must constantly urge the second pinion 45 toward the first pinion 30 to assure full contact between the shoulders 90 and 91 on the pawl means 40 and 46 when the first pinion 30 is being driven by the second pinion 45.

The configuration of the spring means 105 depicted performs this function most adequately. The spring means 105 has a helically coiled medial portion 108 that encircles one of the tangs, for example, tong 96. A hook 109 is provided at one end of the spring means 105 to engage a bore 110 through the yoke 95 and thereby apply the resilient force of the spring to the yoke. A tail 111 extends radially from the opposite end of the medial portion 108 for engagement with the interior of the housing 12 when the yoke 95 is bowed by the axial translation of the second pinion 45. The exact configuration of the spring means 105 and the resiliency of the wire from which it is formed can be selected to provide the degree of force with which the second pinion 45 is biased toward the first pinion 30.

A variable drive embodying the concept of the present invention also permits the fisherman selectively to eliminate the low speed drive, and thus the higher drag. The yoke 95 may be interengaged by a post cam 112, or the like, to comprise a selector means 115. The post cam 112 has a cylindrical body 116 (FIG. 2) that is journaled on the housing 12. The portion of the body 116 extending inwardly of the housing 12 terminates in a cam 118 having the cross-sectional configuration of a segment, as best seen in FIGS. 4 and 5. A lever 119 is affixed to that portion of the body 116 extending outwardly of the housing. When the lever 119 is in the "automatic" position, as shown in FIG. 4, the cam 118 lies adjacent the linear position of the yoke 95 and the variable drive will operate as hereinbefore described.

When, however, the lever 119 is in the "cutout" position, as shown in FIG. 5, the cam 118 moves against, and bows, the yoke 95 to bring the fingers 100 and 101 against the outer wall 120 of the control notch 102 and slide the second pinion 45 axially away from the first pinion 30 a sufficient distance to disengage the pawl means 40 and 46 of the clutch 48. In this way, the gear train 86 is disconnected and only the first gear train 85 remains operative to rotate the flyer 26 in response to rotation of the crank 59.

The embodiment heretofore described details the installation of a variable speed drive embodying the concept of the present invention in conjunction with a spin-casting reel 11. This embodiment is particularly suited to spinning-type reels in which the drag control is positioned to operate by varying the drive friction between the driving shaft and one or more of the driving gears. However, many spinning type reels—e.g., the open face spinning reel—incorporate the drag as a variable frictional resistance against rotation of the line spool. For reels in which there is no desire to have the drag control operate in conjunction with the driving shaft an alternative embodiment is particularly suitable.

Figure 7:
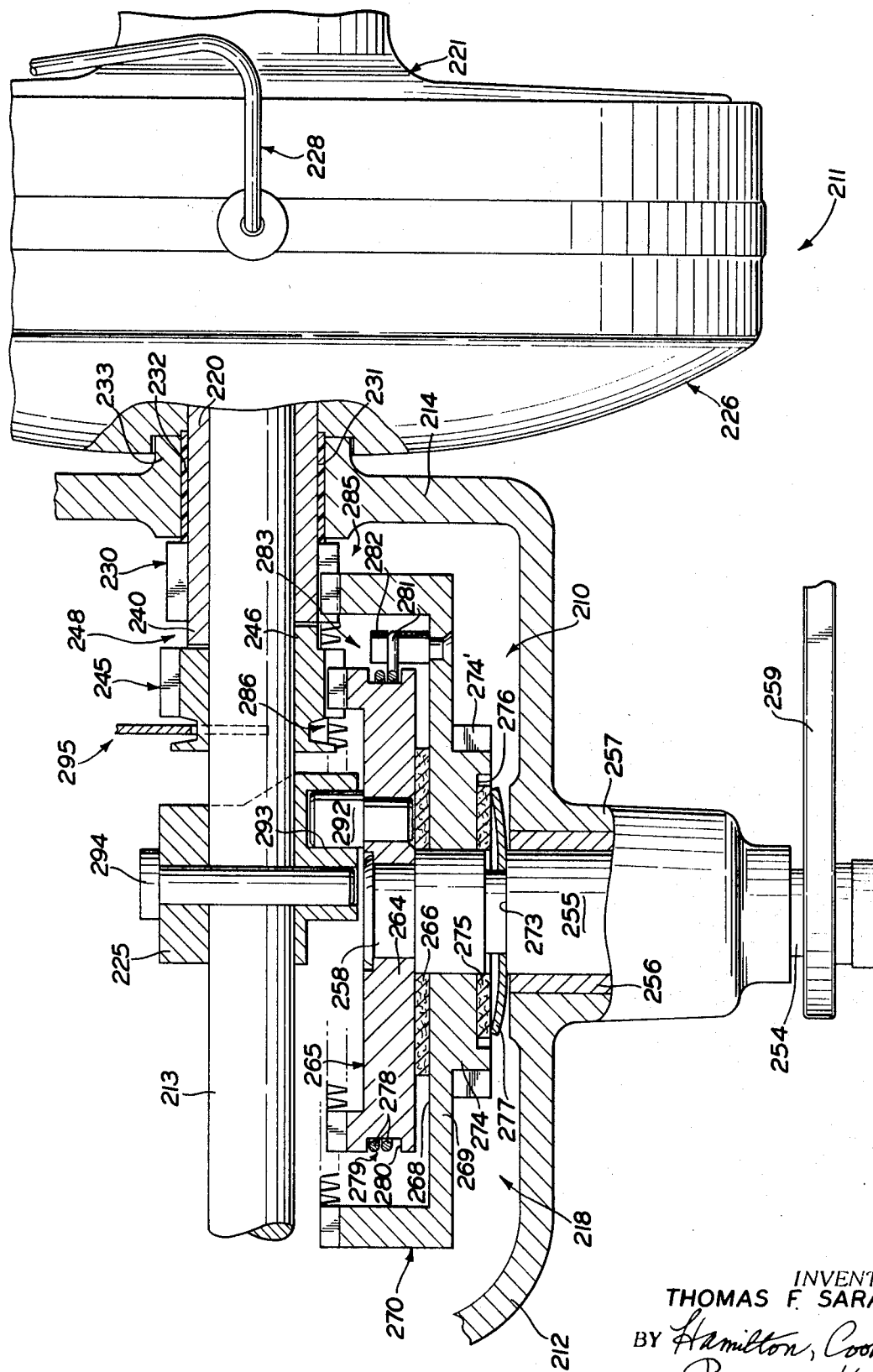
FIG. 7 is a top plan partially in horizontal section of a spinning reel provided with an alternative form of an optionally automatic two speed drive embodying the concept of the present invention; and, FIG. 8 is a horizontal section of an alternative form of an automatic tow speed drive embodying the concept of the present invention as incorporated in a bait casting reel.

Referring to FIG. 7, an alternative embodiment of a variable drive, indicated generally by the numeral 210, is depicted in conjunction with an open face, spinning reel 211. The open face spinning reel has a housing 212 with a nonrotatable spool support beam 213 extending through the forward wall 214 from within the gear compartment 218.

A hollow, driven shaft 220 is rotatably mounted about that portion of the support beam 213 extending through the forward wall 214, and forwardly of the driven shaft 220 a line spool 221 is rotatably mounted on the support beam 213. Rotation of the line spool 221 with respect to the support beam 213, however, is restricted by a drag mechanism at the front of the line spool 221, not shown, as is well known to the art. Interiorly of the gear compartment 218 the support beam 213 is secured to a traverse block 225 that is reciprocated to effect a level wind of the line during retrieval by means hereinafter more fully described.

A flyer 226, carrying the customary bail mechanism 228, is secured to the driven shaft 220 for rotation therewith exteriorly of the housing 212 and in proximity to the forward wall 214. A first pinion 230 is rotatably mounted on the support beam 213 and is secured to the driven shaft 220 interiorly of the gear compartment 218 for rotation with the driven shaft; in fact, the first pinion 230 may even be formed integrally with the driven shaft 220, as shown. To stabilize the driven shaft 220 as well as the flyer 226 and pinion 230 secured thereto, the cylindrical exterior surface 231 of the driven shaft 220 is rotatably journaled in a sleeve bearing 232 secured within a boss 233 provided in the forward wall 214 of the housing 212.

A first pawl means 240 extends axially rearwardly from the first pinion 230 for cooperative interaction with a second pawl means 246 extending axially forward from a second pinion 245 that is rotatably and slidably supported on the support beam 213. The first and second pawl means form a unidirectional clutch 248 that operates in exactly the same fashion as the clutch means 48 disclosed in conjunction with the closed face, spin-casting reel 11.

A driving shaft 255 is rotatably mounted within a hub 257 on housing 212. That portion of the driving shaft 255 that extends into the gear compartment 218 terminates in a shank 258 to which the second driving gear 265 is secured for rotation with, but not with respect to, the driving shaft 255.

A reduced portion of the driving shaft 255 extends exteriorly of the housing 212, and a crank 259 by which rotation of the driving shaft 255 can be effected is nonrotatably mounted thereon. A bearing bushing 256 is interposed between the driving shaft 255 and the hub 257, and a low friction washer 254 is interposed between the hub 257 and the crank 259 to minimize frictional resistance against rotation of the axially fixed driving shaft 255.

Reading from the second driving gear 256 outwardly along the driving shaft 255, the following elements are supported thereon. A low friction spacer 266 is sandwiched between the web 264 of the second driving gear 265 and one surface 268 on the web 269 of a first driving gear 270 that is mounted on the driving shaft 255 to be rotatable with respect thereto. A second, low friction spacer 275 engages the opposite surface 276 on the web 269 of the first gear 270 and is, in turn, engaged by a preferably resilient retaining ring 277 anchored within an annular notch 273 in the driving shaft 255. The web portion of the first driving gear 270 may be provided with a cylindrical shoulder portion 274 that presents a plurality of radially directed teeth 274' for engagement with a clicker pawl, as is well known in the art.

One or more coils 278 of a spring means 279 are helically wrapped within an annular notch 280 in the periphery of the second driving gear 265 resiliently to grasp the latter. A hook 281 on the spring means 279 engages a pin means 282 secured to the web 269 of the first driving gear 270 to form a coupling means 283.

The relative diameters of the two driving gears 270 and 265 may be selected, alone or in conjunction with the diameters of the pinions 230 and 245 with which they are respectfully intermeshed, to provide the desired speed ratios at which the driven shaft 220 will turn with respect to rotation of the driving shaft 255. As shown, the drive train 285 comprising the first driving gear 270 and the meshing first pinion 230 will rotate the driven shaft 220 at a higher speed ratio with respect to rotation of the driving shaft 255 than does the drive train 286 comprising the second driving gear 265, the pinion 245 meshed therewith and the clutch means 248 by which the second pinion 245 is connected through the first pinion 230 to rotate the driven shaft 220.

Turning now to an explanation as to the operation of the variable drive 210, it will be assumed that the fisherman has set the drag mechanism in conformity with the test of the line stored on the spool 221, that the coils 278 of spring means 279 normally grip the second driving gear 265 to preclude relative rotation therebetween and that the strength of the coils 278 is such that they will expand, as hereinafter described, upon the application of a torque loading at which a shift in the transmission ratios is desired.

With provision for the above factors having been properly made, the spinning reel 211 will operate as follows. Rotation of the crank 259 in a direction to retrieve line will turn the driving shaft 255 and the second driving gear 265 affixed thereto. So long as the retrieving resistance is not sufficient to expand the coils 278, the spring means 279 grasps the second driving gear 265 to prevent relative rotation between the two driving gears, the rotating second driving gear 265 turning the first driving gear 270 therewith. The coupling means 283 thus completes the driving connection between the driving shaft 255 and the first driving gear 270.

So long as the first driving gear 270 is thus rotated it will drive the first pinion 230 to rotate the driven shaft 220 and the flyer 226 to retrieve line onto the spool 221. Because the drive train 285 provides the high speed ratio, the first pinion 230 will rotate faster than the second pinion 245, a result accommodated by the unidirectional clutch means 248 in the same manner as affected by the clutch means 48 incorporated in the spin-casting reel 11 heretofore described. With this embodiment as well, it must be appreciated that the axial extent of the second pinion 245 must be sufficient to retain it meshingly engaged with the second driving gear 265 during the axial movement of the second pinion 245 required by the unidirectional clutch means 248.

At a predetermined resistance to line retrieval—preferably less than that required to allow slippage through the drag mechanism not shown—the torque applied from the second driving gear 265 through the coupling means 283 to the first driving gear 270 will be sufficient to cause the coils 278 to tend to unwrap. Thus, the coils of the spring means 279 must be wound onto the second driving gear such that the directional sense followed by the coils as they lead from around the second driving gear 265 toward the hook 281 fastened to the pin means 282 on the first driving gear 270 is substantially the same as the directional sense in which the driving gears must rotate to retrieve line.

When the torque loading on the coupling means 283 is sufficient to permit the second driving gear 265 to slip within the coils 278 of the spring means 279, continued rotation of crank 259 will turn the driving shaft 255 and the second driving gear with respect to the first driving gear 270, and the driven shaft 220 will be turned by the second pinion 245 driving the first pinion 230 through the clutch means 248—i.e., rotation of the driven shaft 220 will be affected by the lower speed ratio drive train 286.

Thus, irrespective of which drive train is transmitting the motion from the driving shaft 255 to the driven shaft 220, the second driving gear 265 will always rotate with the driving shaft 255. Accordingly, a pin 292 affixed eccentrically of the second driving gear 265 and extending parallel to its rotational axis engages a slot 293 in the traverse block 225 secured to the nonrotatable, but reciprocable, support beam 213, as by a pin 294 to reciprocate the line spool 221 and effect level winding of the line thereon.

The open face spinning reel 211 may also employ a flexible yoke 295 and the associated structure biasingly to maintain the clutch means 248 engaged and/or to provide a selective "cutout" of the second drive train 286.

Figure 8:
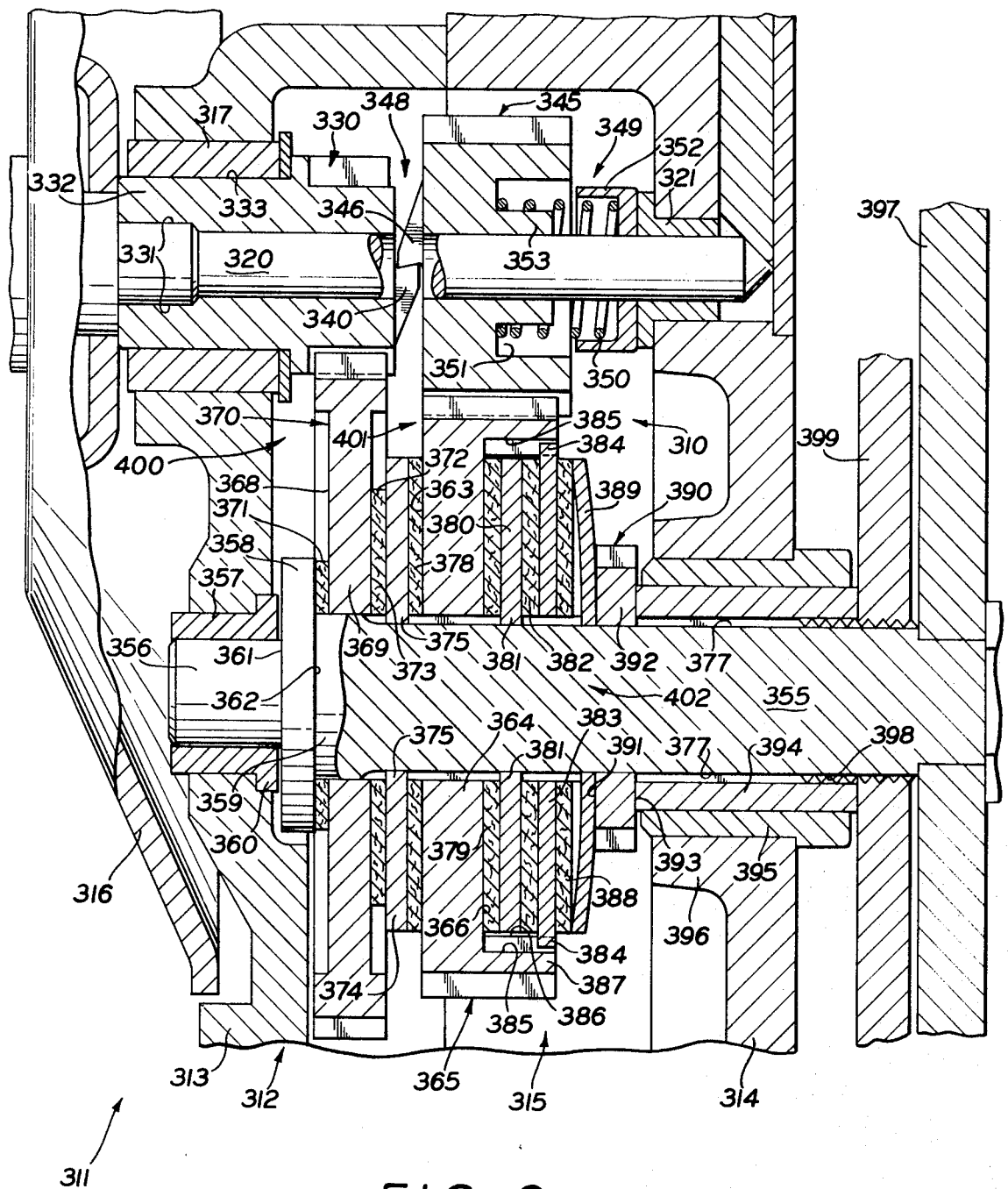

Heretofore, the subject invention has been discussed in conjunction with spinning-type reels but an alternative embodiment can as well be incorporated in casting, or trolling, type reels. Referring to FIG. 8, a further embodiment of the subject variable drive, indicated generally by the numeral 310, is depicted in conjunction with a bait casting, or trolling reel 311 having a frame 312 comprising a headplate 313 rigidly joined to a remote tail plate, not shown. A headcap 314 is removably secured to the headplate 313 and a gear compartment 315 is delineated therebetween. A line spool 316 is rotatably mounted within the frame 312 of reel 311 and is affixed to a spool, or driven, shaft 320 that extends through the headplate 313, across the gear compartment 315 and is rotatably journaled in a bushing 321 carried in the headcap 314.

A first pinion 330 is keyed to, as by the drive flats 331, and rotatable with, the driven shaft 320 which extends therethrough. A stem portion 332 on the first pinion 330 has a cylindrical outer surface 333 that is rotatably journaled in a sleeve bearing 317 mounted in the headplate 313.

A first pawl means 340 extends axially outwardly of the first pinion 330 in a direction opposite the stem portion 332 for cooperative interaction with an opposing second pawl means 346 extending axially from a second pinion 345 that is rotatably and slidably supported on the driven shaft 320.

The first and second pawl means form an unidirectional clutch 348 that operates in exactly the same manner as the clutch means 48 employed in conjunction with the spin-casting reel 11.

A resilient means 349 biasingly maintains the clutch means 348 engaged. Specifically a compression spring 350 encircles the driven shaft 320 and engages the second pinion 345 to urge it toward the first pinion 330 and thereby maintain the clutch means 348 engaged. In order to conserve space, a trepan 351 may be provided in the second pinion 345 to receive the spring 350. By employing this construction the second pinion is permitted to move axially away from the first pinion 330 along the driven shaft 320 in response to the camming action of the unidirectional clutch means 348 without overly crowding the spring 350. By the same token, a cap 352 receives the opposite end of the spring 350 to maintain it in alignment with the trepan 351 to preclude any possible interference between the hub 353 of the second pinion 345 and the spring 350 during axial translation of the second pinion 345.

A driving shaft 355 extends across the gear compartment 315 in parallel relation with the driven shaft 320. The shank portion 356 of the driving shaft 355 is journaled in a bearing bushing 357 supported in the head plate 313. A foot flange 358 extends radially of the driving shaft 355 at the juncture of the shank portion 356 to the main body portion 359 of the driving shaft 355. A lip flange 360 is preferably provided on the bushing 357 to provide a low friction stop against which one face 361 on the foot flange 358 may bottom. The opposite face 362 of the foot flange 358 is engaged by a drag washer 371 sandwiched between the foot flange 358 and one face 368 on the web 369 of the first driving gear 370. A second drag washer 372 engages the opposite face 373 of the web 369, and all three elements—the two drag washer 371 and 372 as well as the first driving gear 370—are rotatably mounted on the body portion 359 of the driving shaft 355.

The next element positioned axially along the driving shaft 355 is a compression disc 374 having at least one radially inwardly directed key 375 received within a keyway 377 extending axially of the driving shaft 355 to permit the compression disc 374 to be slidable axially along the driving shaft 355 and yet be nonrotatable with respect thereto.

Successively outwardly along the driving shaft 355 a third drag washer 378 is interposed between the compression disc 374 and one surface 363 on the web 364 of the second driving gear 365. The opposite face 366 on the web 364 of the second driving gear 365 is contacted by a fourth drag washer 379 and the two drag washers 378 and 379 as well as the second driving gear 365 are also rotatably mounted on the driving shaft 355.

A second compression disc 380 bears against the fourth drag washer 379 and has at least one radially inwardly directed key 381 also received within the keyway 377 to assure that the second compression disc is also slidable axially along the driving shaft but nonrotatable with respect thereto. The second compression disc 380 is, in turn, engaged by a fifth drag washer 382 rotatably mounted on the driving shaft 355. A third compression disc 383 is the next successive element mounted on the driving shaft 355, and it engages the fifth drag washer 382. This third compression disc 383, however, has at least one key 384 that extends radially outwardly to engage an axial keyway 385 formed on the peripheral wall 386 of a cavity formed by an annular extension of the rim portion 387 on the second driving gear 365 axially beyond the web 364 thereof. The third compression disc 383 is, therefore, axially slidable with respect both to the driving shaft 355 and the second driving gear 365; it is rotatable with respect to the driving shaft 355, and, it is nonrotatable with respect to the second driving gear 365.

Stacked on the driving shaft 355 in axial juxtaposition with the third compression disc 383 is a sixth drag washer 388 that is also rotatably mounted on the shaft The sixth drag washer 388 is, in turn, engaged by a resilient means such as the bowed spring 389 that is preferably also keyed to the driving shaft 355 so as to be axially translatable but nonrotatable with respect thereto.

Should it be desired to include one of the well-known antireverse mechanisms, an antireverse ratched wheel 390 may also be keyed to the driving shaft 355 to be axially translatable but nonrotatable with respect thereto. One surface 391 on the web portion 392 of the ratchet wheel 390 contacts the spring 389, and the opposite surface 393 is engaged by a sleeve bushing 394 that is slidably supported on the driving shaft 355 and journaled within a bearing 395 mounted in a hub 396 on the head cap 314.

The end of the driving shaft 355 terminating outwardly of the head cap 314 nonrotatably mounts a crank 397 by which rotation of the driving shaft can be effected. That portion of the driving shaft extending from a location within the sleeve bushing 394 outwardly to the crank 397 is provided with threads 398 upon which a drag control knob 399 may be mounted. In this embodiment, as well, the control knob 399 may have any shape that is convenient for easy operation, but the standard star wheel form is generally accepted as being most suitable.

When the driving and driven gears are parallel, as is normally the situation when the subject variable drive is incorporated in a bait casting reel, the relative diameters of the driving gears and the pinions with which the respectively intermesh must both be selected to provide the desired speed ratios at which the driven shaft 320 will turn with respect to rotation of the driving shaft In this third alternative embodiment the gear train 400 comprising the first driving gear 370 and the meshing first pinion 330 will drive the driven shaft 320 at a higher speed ratio with respect to rotation of the driving shaft 355 than does the gear train 401 comprising the second driving gear 365, the second pinion 345 meshed therewith and the clutch means 348 connected through the first pinion 330 to rotate the driven shaft 320.

Here, too, to explain the operation of the variable drive depicted in conjunction with bait casting reel 311 it will be assumed that the fisherman has set the drag control knob 399 in accordance with the test of the line being used. As such, when the crank 397 is rotated to retrieve the line against little or no resistance, both driving gears 365 and 370 will rotate with the driving shaft 355, and the pinion 330 in the higher speed ratio gear train 400 will overrun the second pinion 345, as permitted by the unidirectional clutch means 348 hereinbefore described in conjunction with the alternative embodiments. However, once sufficient resistance against retrieval of the line is met that the torque loading applied back through the first pinion 330 and into the first driving gear 370 allows the driving shaft 355 to rotate with respect to the first driving gear 370 (but is still not sufficient to endanger the line), the second driving gear 365 will continue to rotate with the driving shaft 355 so that the second pinion 345 will tend to rotate faster than the first pinion 330. In this situation the clutch 348 will engage, and the second pinion 345 will drive the first pinion 330 to rotate the driven shaft 320.

At this point it should be explained that even though the diameter of the second driving gear 365 is of lesser magnitude than that of the first driving gear 370, the torque required to rotate the second driving gear 365 with respect to the driving shaft 355 can assuredly be greater than that required to rotate the first driving gear 370 with respect to the driving shaft 355 by compounding the drag effect through the use of a compression disc 383 that is nonrotatable with respect to the driving gear 365 in conjunction with the compression disc 380 that is nonrotatable with respect to the driving shaft 355. In this way one can increase not only the number, but also the area of contact surfaces available for engagement by the drag washers 379, 382 and 388 in order to apply a greater frictional resistance against relative rotation of the second driving gear 365 with respect to the driving shaft 355.

Should the resistance to line retrieval dangerously approach the test strength of the line, the torque loading between the second driving gear 365 and the driving shaft 355 will exceed the frictional interconnection therebetween so that the driving shaft 355 will be able to rotate with respect to the second driving gear 365 as well. To bring the explanation full circle, it is this latter frictional resistance that the fisherman would have established when setting the drag control knob 399 initially.

Even though the coupling means 402—a composite assembly of the drag washers and compression discs—in this last described alternative embodiment of variable drive 310 employs a greater number of components than the coupling means depicted with the two previously described alternative embodiments, it also functions to provide an operative connection between the driving shaft and those driving gears that are rotatably mounted thereon.

It should now be apparent to one skilled in the art that a variable drive embodying the concept of the present invention provides two speed ratios between driving and driven shafts in a fishing reel that are automatically selected in response to the resistance offered against retrieval of the line thereby and otherwise accomplishes the objects of the invention.

What I claim is:

1. A variable drive to provide first and second transmission ratios for a fishing reel comprising, a driving shaft, first and second driving gears carried on said driving shaft, said first driving gear being a part of a gear train of the first transmission ratio and said second driving gear being a part of a gear train of the second transmission ratio, at least said first driving gear being rotatable with respect to said driving shaft, a coupling means engaging at least said first driving gear to permit said driving gear to slip rotatably with respect to said driving shaft in response to a predetermined torque loading, a driven shaft, a first pinion operatively connected to said driven shaft to be rotatable therewith and meshingly engaging said first driving gear, a second pinion mounted on said driven shaft to move with respect thereto, said second pinion meshingly engaging said second driving gear, and a clutch means interconnecting said first and second pinions for unidirectional drive.

2. A variable drive, as set forth in claim 1, in which the second pinion is rotatable and axially slidable with respect to said driven shaft.

3. A variable drive, as set forth in claim 1, in which the second transmission ratio is of lesser magnitude than said first transmission ratio.

4. A variable drive, as set forth in claim 2, in which the clutch means disengage upon axial separation of said pinions and in which selector means engage said second pinion selectively to maintain said second pinion axially separated.

5. A variable drive, as set forth in claim 2, in which said clutch means disengage upon axial separation of said pinion and in which resilient means urge second pinion toward said first pinion biasingly to maintain said clutch means normally engaged.

6. A variable drive, as set forth in claim 5, in which said clutch means comprises a pawl means on each said pinion, each said pawl means having a camming surface and a shoulder, said camming surfaces interacting to slide said second pinion axially of said first pinion when said first pinion rotates at a rate faster than said second pinion, said shoulders interacting to provide a driving connection between said pinions when said second pinion tends to rotate faster than said first pinion.

7. A variable drive, as set forth in claim 6, in which selector means engage said second pinion selectively to maintain said second pinion selectively separated from said first pinion with said pawl means disengaged.

8. A variable drive, as set forth in claim 7, in which said selector means comprises a flexible yoke engaging said second pinion and means to bow said yoke and displace said second pinion.

9. A variable drive, as set forth in claim 8, in which a cam selectively bows said yoke.

10. A variable drive, as set forth in claim 8, in which a spring means engages said yoke biasingly to urge said second pinion toward said first pinion when said pinions are separated.

11. A variable drive, as set forth in claim 2, in which resilient means urge said second pinion axially toward said first pinion.

12. A variable drive, as set forth in claim 11, in which a trepan is provided in said second pinion, a cup is carried on said driven shaft in opposition to said trepan, and said resilient means comprises a spring operable between said trepan and said cup.

13. A variable drive, as set forth in claim 1, in which said first and second driving gears are both rotatably mounted on said driving shaft and said coupling means engages both said driving gears to permit said two driving gears to slip with respect to said driving shaft at different, predetermined torque loadings.

14. A variable drive, as set forth in claim 13, in which said driving gears have web portions and said coupling means comprises drag washers that frictionally engage said web portions, the areas of contact and the coefficients of friction between said drag washers and the web portions of said driving gears assuring a differential in the torque loading at which said driving gears rotatably slip with respect to said driving shaft.

15. A variable drive, as set forth in claim 14, in which a foot flange extends radially of said driving shaft and a control means is spaced axially of said foot flange, said drag washers alternating with said driving gears and sandwiched between said foot flange and said control means, said control means being selectively movable toward and away from said foot flange to preestablish the torque loading at which at least one of said driving gears will rotatably slip with respect to said driving shaft.

16. A variable drive, as set forth in claim 15, in which compression discs are interposed between said drag washers and additional drag washers, said compression discs being operatively connected between said driving shaft and at least one of said driving gears to compound the frictional engagement between said driving gear and said driving shaft.

17. A variable drive, as set forth in claim 3, in which the second of said driving gears is secured to said driving shaft to rotate only therewith, said coupling means being connected between said two driving gears.

18. A variable drive, as set forth in claim 17, in which the coupling means comprises a spring coiled about second driving gear grippingly to engage said second driving gear and rotate therewith, said spring being anchored to said first driving gear, a predetermined torque loading on said spring tending to expand said spring coils and permit said second driving gear to rotate with respect thereto.

UNITED STATES PATENT OFFICE
CERTIFICATE OF CORRECTION

Patent No. 3,600,964                     Dated August 24, 1971

Inventor(s)    Thomas F. Sarah

It is certified that error appears in the above-identified patent and that said Letters Patent are hereby corrected as shown below:

In the Abstract, line 5, after "driving" cancel "rod"; line 9, "the" should read -- that --. Column 1, line 20, cancel "in". Column 2, line 30, "portion" should read -- pinion --. Column 3, line 35, "now" should read -- not --. Column 4, line 42, "A" should read -- The --. Column 5, line 4, after "at" insert -- a --. Column 6, line 14, "tong" should read -- tang --. Column 8, line 71, after "trolling" insert a comma. Column 10, line 44, after "shaft" insert -- 355. --.

Signed and sealed this 20th day of June 1972.

(SEAL)
Attest:

EDWARD M. FLETCHER, JR.　　　　　　　　ROBERT GOTTSCHALK
Attesting Officer　　　　　　　　　　　Commissioner of Patents